3,385,738
CHROMATE CONVERSION COATING FOR ALUMINUM
William S. Russell, Warren, Mich., assignor to Hooker Chemical Corporation, Niagara Falls, N.Y., a corporation of New York
No Drawing. Filed Nov. 10, 1964, Ser. No. 410,263
16 Claims. (Cl. 148—6.2)

ABSTRACT OF THE DISCLOSURE

A process for forming protective coatings on aluminum-containing surfaces wherein the surface is contacted with an aqueous acidic solution which contains hexavalent chromium ions, fluoride ions, and from 0.01 to 0.1% by weight of the solution of arsenic, as an accelerator. The aqueous coating solution is maintained in contact with the aluminum containing surface for a period sufficient to form the desired protective coating on the aluminum surface.

---

This invention relates to an improved composition and process for coating metal surfaces and, more particularly, relates to improved compositions and methods for chemically coating aluminum and aluminum alloy surfaces to provide corrosion resistant and paint bonding coating on such surfaces.

Many compositions and processes have been proposed in the past for forming chemical films on surfaces of aluminum, and particularly surfaces of aluminum and aluminum alloys. From a commercial standpoint, the most successful of these processes are those wherein the aluminum containing surface to be coated is contacted with an acidic solution containing a source of hexavalent chromium. In such processes, the attempt has been made to provide a method which is not only useful in treating various types of aluminum and aluminum alloys, but also to provide a coating solution which is relatively simple to prepare initially and which is easily maintained in effective coating condition during use.

For the most part, these prior art compositions have been aqueous acidic solutions containing a source of hexavalent chromium ions and a source of fluoride ions. It has also been the general practice to add to these basic compositions various additional anions or cations in order to obtain specific objectives, such as activation of the solution in order to obtain increased coating weight and coating efficiency. Exemplary of such modified compositions is that set forth in U.S. Patent 2,796,370, wherein ferricyanide is utilized as the modifying or activating anion.

In the commercial operation of chromate-fluoride, ferricyanide activated solutions for coating aluminum, a number of operational difficulties have been encountered. These solutions must always contain a certain minimum quantity of ferricyanide ion in order to preserve the coating rate and coating efficiency in the solution at levels which are commercially acceptable from the standpoints of both quality and economy. It is known that the ferricyanide ion is sensitive to temperature degradation at temperatures above about 50 degrees centigrade, and unless care is constantly exercised to avoid exceeding this temperature, even at localized areas within the operating tank, the ferricyanide becomes degraded and incapable of maintaining the solution in acceptable coating-forming condition. Additionally, it has been found that these ferricyanide activated solutions are relatively sensitive to acidity and, thus, require considerable maintenance of the necessary acidity within a fairly narrow range. Moreover, these solutions are found to lose their ability merely upon standing at room temperature without the use and the replenishment of them is complicated because the ferricyanide and chromate-fluoride component must be added separately to the solution and must be maintained, prior to addition, in separate containers, in order to avoid reaction between these components.

It is, therefore, an object of the present invention to provide an improved chromate-fluoride coating solution which is capable of operations at high speed and high coating efficiencies to form a corrosion resistant, paint receptive coating on aluminum containing surfaces.

Another object of the present invention is to provide an improved chromate-fluoride coating solution which is capable of operating at high coating rates and high coating efficiencies over a wide range of pH and temperature values.

A further object of the present invention is to provide an improved process for coating aluminum containing surfaces, which process capable of being maintained in optimum coating-forming condition by replenishing with a single replenishing material.

A still further object of the invention is to provide an improved process for coating aluminum surfaces which process is economical to use, easy to control and maintain in optimum coating-forming condition and which is capable of providing adherent, corrosion resistant coatings.

These and other objects of the invention will become apparent to those skilled in the art from the description of the invention which follows.

Pursuant to the above objects, the present invention includes a coating composition which comprises an aqueous acidic solution, substantially free of phosphate ions, and which contains hexavalent chromium ions, fluoride ions and from 0.01 to 0.1 percent arsenic.

More specifically, the composition of the present invention is an aqueous acidic solution which is substantially free of phosphate ions, i.e., $PO_4^\equiv$. It has been found, in the present composition, that not only do the phosphate ions not add any beneficial properties to the composition but, in many instances, are in fact detrimental to the operation and maintenance of the coating solution and to the protective coatings which are produced. Accordingly, it is desirable that the coating solutions of the present invention be substantially free of these ions. By "substantially free" is meant that the solutions are free of at least that quantity of phosphate ions which may be detrimental to the solution or the coating produced. It is not necessarily intended, however, to exclude minor amounts of such ions which are not detrimental, such as those which may be present in the water used in making up the aqueous solution, e.g., amounts less than about 0.05 percent by weight of the solution.

The aqueous acidic coating solutions of the present invention contain hexavalent chromium ions in an amount sufficient to provide the desired chromium coating on the aluminum surfaces treated therewith. Desirably, these solutions contain hexavalent chromium ions, calculated as $CrO_3$, in an amount within the range of about 0.05 to about 1 percent, weight/volume (w./v.), i.e., percent weight per unit volume of solution. The hexavalent chromium ions may be added to the solution in many suitable forms, such as chromic acid, or one or more of the water soluble or water dispersible salts of chromic acid. Exemplary of the salts which may be used are the sodium, potassium or ammonium salts, such as the chromates and dichromates, as well as admixtures thereof both with each other and/or with chromic acid.

The fluoride ion is present in the subject composition in an amount sufficient to cause attack of the aluminum containing surface to be coated and to effect formation of the resulting coating on this surface. Desirably, the fluoride ion is present in an amount within the range of about 0.16 to about 2.7 percent w./v. As with the hexavalent chromium ion, the fluoride ions may be added to the present composition in many convenient forms, including various fluorine-containing compounds which are capable of ionizing in the aqueous acidic solutions of the invention to provide fluoride ions. Exemplary of such fluorine containing compounds which may be used are hydrofluoric acid, fluosilicic acid, fluoboric acid, as well as the various water soluble or water dispersible salts thereof, such as the sodium, potassium, and ammonium salts.

As has been indicated hereinabove, there is also included in the present composition, 0.01 to 0.1 percent w./v. of arsenic. It is believed that in the present composition, the arsenic acts as an activator which makes it possible to obtain and maintain high coating weights and coating efficiencies. The arsenic may be added to the coating solution in the form of various compounds which are ionizable in the solution, such as arsenic acid, as well as various water soluble or water dispersible salts thereof which will provide the desired arsenic ion when oxidized in the solution by the chromic acid or chromic acid salts. Exemplary of such arsenic containing salts which may be used are the sodium, potassium, or ammonium salts of arsenic acid.

In addition to the above components, in many instances, it has also been found desirable to include in the present composition an aluminum fluoride complex ion, which ion is desirably present in an amount equivalent to about 0.22 to about 3.2 percent w./v. of $Al(F)_x$. The aluminum fluoride ion is expressed as $Al(F)_x$ because, when used, it is present in the operating solution as an equilibrium of $Al(F)$ ions which may contain from 1 to 6 fluoride atoms per aluminum atom. In the solutions of the present invention, it has been found that this equilibrium averages out to be approximately equivalent to the $Al(F)_3$ ion. Accordingly, as used in the specification and claims, the expression $Al(F)_x$ is intended to represent any aluminum fluoride ion and the quantities thereof refere to an amount of such ion equivalent to the $Al(F)_3$ ion. This aluminum fluoride complex ion, when used, may be incorporated in the present coating solution as such, or may be formed in the solution as a complex from free aluminum and fluoride ions. In the latter instance, the fluoride may be present as hydrofluoric acid, fluoboric acid, fluosilicic acid, or the like. Where the aluminum fluoride complex is added as such, it may be prepared by dissolving aluminum oxide ($Al_2O_3$) in water and hydrofluoric acid in appropriate proportions to obtain the requisite parts of $Al(F)_3$ for the composition.

Particularly preferred compositions of the present invention are those falling within the following formulation.

| Solution component: | Concentration percent w./v. |
|---|---|
| Hexavalent chromium ions (calculated as $CrO_3$) | 0.2 to 0.5 |
| Fluoride ions | 0.16 to 1.6 |
| Arsenic | 0.03 to 0.1 |
| $Al(F)_x$ complex | 0.22 to 1.9 |

The solutions of the present invention may be used to form coatings on surfaces containing aluminum, such as aluminum itself or aluminum alloys which are predominantly aluminum, using various coating techniques, such as dipping, brushing, spraying, flooding, or the like. Preferably, the solutions of the present invention are applied to the aluminum surfaces after these surfaces have been subjected to conventional cleaning procedures which free the surface to be treated of oil, grease, oxides, and the like. Additionally, the present solutions may be applied to the aluminum surfaces by atomizing the solution on the surface in a heated condition, in accordance with the procedure set forth in a copending application, Serial Number 728,095, filed April 14, 1958, now abandoned. Generally stated, this atomization application technique includes the steps of preliminary heating the aluminum or aluminum alloy surface to be coated to a temperature above about 65 degrees centigrade and atomizing on the heated surface a quantity of the coating solution sufficient to form the desired coating, but insufficient to cause the droplets of atomized coating solution to coalesce or puddle on the surface. The coating on the aluminum surface results from the substantially instantaneous flashing or volatilization of the liquid from the solution, so that each individual atomized particle droplet remains substantially in the locus of its original contact with the surface treated.

Although the coating process of the present invention may be carried out effectively and with good efficiency over a wide range of solution temperatures and solution acidities, it has been found that the rate of coating may be improved and the coating efficiency increased by the concurrent selection and control of the degree of the acidity of the solution and its temperature of application. With regard to the temperature, it has been found that as the temperature of the operating solution is increased from room temperature, i.e., about 20 degrees centigrade, up to about 50 degrees centigrade, the coating rate rapidly increases and, in some instances, it is possible to obtain an increase in the coating rate of from 2 to 5 times that obtained at room temperature. At solution temperatures within the range of about 50 to about 70 degrees centigrade, the coating rate has been found to increase much more slowly and, for all practical purposes, has been found to be substantially uniform throughout this temperature range. It is, therefore, preferred to utilize the solutions of the present invention at solution temperatures within the range of about 50 to about 70 degrees centigrade. Higher temperatures than 70 degrees centigrade may be employed, for example temperatures of 80 degrees centigrade or even up to the solution boiling point, but no particular advantages in terms of increased coating rates, are obtained by operating at such higher temperatures.

With regard to the pH of the operating solutions of the present invention, it has been found that this, as with the temperature, affects the coating rate and coating efficiences of the solution being applied to the aluminum containing surfaces. Accordingly, it is desirable that the coating solution have a pH within the range of about 1.1 to about 2.3, and preferably in the range of about 1.6 to about 2.1. This pH range refers to measurements taken by using an electrical pH meter, employing a glass electrode and calomel electrode, by immersing the electrodes in fresh portions of the operating solution and observing the indicated values.

In addition to the pH of the operating solution, it is also desirable that the operating solution have a concentration with the range of about 7 to about 15 points and that once the concentration has been established within this range it is maintained within about ±0.5 points of the established value. The concentration of the operating solution in points, is determined by the following procedure:

To a ten milliliter sample of the operating solution there is added 25 milliliters of 50 percent sulfuric acid and 2 drops of orthophenanthriline ferrous complex (ferroin) indicator. This solution is then titrated with 0.1 ferrous sulfate in dilute sulphuric acid until the solution changes through blue to a reddish-brown color. The concentration points of the operating solution are the number of milliliters of the 0.1 N titrating solution used. It is to be appreciated, that although the operating solution of the present invention is desirably used at a concentration within the range of about 7 to 15 points, operation of the solution at both higher and lower point concentrations is not only possible, but in some instances, is preferred.

Following the application of the coating solution of the present invention to the aluminum containing surfaces to be treated, the thus-coated surfaces are then desirably rinsed with water. Either spray or immersion techniques for the water rinse may be used, with rinsing times of about 3 to 5 seconds' duration being typical. Following the water rinse, if desired, the coated surface may be given an additional rinse with deionized water or with a dilute solution of hexavalent chromium, e.g., $CrO_3$. This latter rinse is preferably effected by spraying, rinsing times of about 3 to 5 seconds' duration at temperatures within the range of about 55 to 65 degrees centigrade, being typical. After rinsing of the coated aluminum surface has been completed, the surfaces are preferably dried so as to remove any surface moisture. The coatings thus-produced on the aluminum surfaces are slightly colored and vary in appearance from iridescent to light gold or yellow brown. The color changes in the coatings produced may be used as a guide to the coating weights obtained, the darker colors being produced with higher coating weights and the lighter colors resulting from lower coating weights.

In formulating the operating solutions of the present invention, a make-up composition, containing the components desired in the operating solution, is admixed with water in amounts suitable to provide concentrations of the components within the ranges as set forth hereinabove. Normally, in addition to the above indicated components, the make-up composition may also contain an inorganic acid such as nitric acid or the like in order to provide the desired acidity or pH. Suitable make-up compositions are those falling within the following formulation.

| Component: | Parts by weight |
| --- | --- |
| $CrO_3$ | 15–20 |
| HF | 4–7 |
| Inorganic acid, such as $HNO_3$ | 1–5 |
| Arsenic activator composition | 2–5 |
| $Al(F)_x$ (average $AlF_3$) | 3–6 |

It will be appreciated that this is a single package make-up composition as compared to the prior art compositions wherein separate packaging of some of the make-up components was often necessary.

In the operation of the process of the present invention, the components of the coating solution are depleted. Accordingly, in order to maintain these components in the operating solution within the preferred ranges which have been set forth hereinabove, it is desirable, in order to obtain a continuous operation, to periodically replenish the operating solution. One advantage of the present composition is that, as with the make-up composition, this replenishing may be effected using a single package replenishing material, as opposed to many of the prior art compositions wherein separate addition of the components during replenishing is necessary. As in the make-up composition, in addition to the hexavalent chromium, fluoride, arsenic and aluminum fluoride complex components, it may also be desirable to include in the replenishing material an acid, such as nitric acid, sulphuric acid, hydrochloric acid, or the like, so as to maintain the acidity of pH of the operating solution within the desired ranges as have been indicated hereinabove. Additionally, rather than fluosilicic acid or fluoboric acid, it may also be desirable to include in the replenishing material a quantity of boric acid, to act as a buffer for the fluoride ions. This addition of boric acid may also be desirable in making up the original operating solution, when the fluoride ion is added as hydrogen fluoride, and particularly where the aluminum fluoride complex ion is not included in the original solution. Where boric acid is included in the original operating solution, it is desirably added in an amount within a range of about 0.1 to about 0.2 percent w./v., although amounts up to the maximum solubility in the solution may be used.

A single package replenishing material suitable for use in maintaining the operating solution of the present invention in optimum coating forming condition may contain the following components in the amounts indicated.

| Components: | Parts by weight |
| --- | --- |
| Hexavalent chromium (calculated as $CrO_3$) | 15 to 20 |
| HF | 7 to 12 |
| Acid | 1.4 to 7 |
| Alkali metal arsenate | 3 to 6.5 |
| $Al(F)_x$ (average $AlF_3$) | 0.6 to 1.6 |

Additionally, this composition may also contain about 1.2 to about 2 parts by weight of boric acid ($H_3BO_3$).

A preferred replenishing material, having particular utility for use with a continuous strip line operating, is one containing the following components in the amounts indicated.

| Components: | Parts by weight |
| --- | --- |
| $CrO_3$ | 18 to 20 |
| HF | 10 to 12 |
| $HNO_3$ | 5 to 7 |
| Sodium arsenate ($Na_2HAsO_4 \cdot 7H_2O$) | 3 to 6 |
| $Al(F)_x$ (average $AlF_3$) | 0.8 to 1.5 |

A preferred replenishing material, particularly suitable for production operations in which the parts to be coated are moved through a spray installation on a monorail conveyer, is one having the following components in the amounts indicated.

| Components: | Parts by weight |
| --- | --- |
| $CrO_3$ | 15 to 17 |
| HF | 8 to 11 |
| $HNO_3$ | 4.5 to 6.5 |
| Sodium arsenate ($Na_2HAsO_4 \cdot 7H_2O$) | 3.5 to 6.5 |
| $Al(F)_x$ (average $AlF_3$) | 1 to 1.6 |

As has been indicated hereinabove, the presence in the operating solution of the present invention of foreign cations, that is, cations other than the sodium, potassium or ammonium ions normally introduced, together with the fluoride or arsenic ion, have been found to be undesirable and to detrimentally affect the coating rate and coating efficiencies which may be obtained by using the solution of the present invention in the manner in which it has been described above. In particular, trivalent chromium ion in amounts in excess of about 0.1 percent by weight of the solution have been found to have an appreciably adverse affect on the coating rate and coating efficiencies obtained. Accordingly, it has been found to be particularly advantageous to maintain the solutions of the present invention in optimum operating conditions by operating these solutions in conjunction with an ion exchange unit of the type and by the procedures described in U.S. Patent 2,967,791, issued Jan. 10, 1961. In operating the present solutions with such an ion exchange unit which employs a cation exchange resin, the solutions are maintained substantially free of metallic cations other than aluminum, which occurs in the solutions as aluminum fluoride complex ions, and these complexes are controlled in concentration in the solution by the ion exchange unit.

By the method of the present invention, corrosion resistant, adherent coatings are formed on the aluminum or aluminum alloy surfaces treated in the matter of a few seconds, typically about 1 to about 20 seconds. Moreover, by modifying the composition as to the arsenic content, fluoride content, aluminum fluoride complex content, as well as to pH acidity, it is possible to maintain a coating rate which is sufficiently fast as to form coatings on continuous strips of aluminum or aluminum alloys, which coatings have a weight in the range of about 15 to about 40 milligrams per square foot, in contact times of about 1 to 2 seconds.

In order that those skilled in the art may better understand the present invention and the manner in which it may be practiced, the following specific examples are given. It is to be understood, that these examples are presented for illustrative purposes only and are not intended to be taken as a limitation on the present invention. In these examples, unless otherwise indicated, temperatures are in degrees Centigrade and amounts are in percent weight/volume. Additionally, the term "Coating Efficiency" refers to the quantity of coating formed relative to the amount of metal dissolved from the surface of the metal being coated and is, specifically, the ratio obtained by dividing the metal loss, in milligrams per square foot of surface treated, by the coating weight on the same area, in milligrams per square foot. Thus, as this numerical ratio decreases, the coating efficiency increases and the lowest numbers represent the highest efficiency of coating information.

Example 1

A coating solution was prepared containing 0.5 percent $CrO_3$ and 0.2 percent fluoride by combining 30 grams of $CrO_3$, 50 milliliters of a 20 percent aqueous solution of $HBF_4$ and diluting with water to 6 liters. This solution, which had a pH of 1.38, was heated to about 50 degrees centigrade and panels of 3003 aluminum were coated by spraying for 15 seconds with the solution. These panels had a coating weight of 42 milligrams per square foot and the coating efficiency was 0.39. There was then added to the solution 9 grams of sodium arsenate ($NaHAsO_4 \cdot 7H_2O$), equivalent to about 0.055 percent $As_2O_5$ in the solution, and additional aluminum panels were coated as above. These panels had a coating weight of 62 milligrams per square foot and the coating efficiency was 0.22.

Example 2

A coating solution was made up as in the second part of the preceding example except that in addition to $CrO_3$, $HBF_4$ and sodium arsenate there was also added 5 grams $Al(OH)_3$ and 4 milliliters of $HNO_3$. There was also added an additional 10 milliliters of the $HBF_4$ solution. Aluminum panels were coated as in Example 1 and the coating weight obtained was 60 milligrams per square foot and the coating efficiency was 0.17.

Example 3

A solution was prepared containing 0.5 percent $CrO_3$, 0.3 percent fluoride as $HBF_4$, 0.1 percent arsenic, added as $NaHAsO_4 \cdot 7H_2O$, and 0.3 percent $Al(F)_x$ (average $AlF_3$). This solution which had a pH of 1.75, a total fluoride of 0.55 percent was placed in a 2,000 gallon tank and heated to 50 degrees centigrade.

Aluminum builder stock 3105 was coated by spraying with the solution for 15 seconds. The coatings produced were light-gold in color and had a coating weight of about 50 milligrams per square foot. The coating efficiency was 0.20. The solution was maintained substantially free of trivalent chromium ions and at the above level of aluminum fluoride complex concentration by constantly cycling a small portion of the solution through an ion exchange resin column filled with Dowex, 20–100 mesh cation exchange resin, and after many thousands of surface feet of aluminum had been processed through the solution, the coating obtained was still similar in appearance and the coating weight and the coating efficiency remained substantially constant.

The above examples are repeated using other sources of hexavalent chromium and fluoride, including sodium and potassium dichromate and fluosilicic acid and HF, respectively, to obtain similar results. The coatings thus produced are found to be excellent paint base coatings and when painted, give good results when subjected to the 5 percent salt spray, humidity, adhesion and other physical tests.

While there have been described various embodiments of the invention, the compositions and methods described are not intended to be understood as limiting the scope of the invention as it is realized that changes therewithin are possible and it is further intended that each element recited in any of the following claims is intended to be understood as referring to all equivalent elements for accomplishing substantially the same results in substantially the same or equivalent manner, it being intended to cover the invention broadly in whatever form its principal may be utilized.

What is claimed is:

1. A composition suitable for forming a protective coating on aluminum containing surfaces which consists essentially of an aqueous acidic solution, which contains an effective coating amount of hexavalent chromium ions, fluoride ions in an amount effective to attack the aluminum surface being treated and 0.01 to 0.1 percent of arsenic.

2. The composition as claimed in claim 1 wherein there is also present an aluminum fluoride complex.

3. A composition suitable for forming a protective coating on aluminum containing surfaces which consists essentially of an aqueous acidic solution which contains, in percent w./v., 0.05 to 1 hexavalent chromium ion, calculated as $CrO_3$, 0.16 to 2.7 fluoride ions, and 0.01 to 0.1 arsenic.

4. The composition as claimed in claim 3 wherein the solution also contains, in percent w./v., 0.22 to 3.2 $Al(F)_x$ complex.

5. The composition as claimed in claim 4 wherein the solution contains in percent w./v., 0.2 to 0.5 hexavalent chromium ions, calculated as $CrO_3$, 0.16 to 1.6 fluoride ions, 0.03 to 0.1 arsenic, and 0.22 to 1.9 $Al(F)_x$ complex.

6. A method of forming a protective coating on aluminum-containing surfaces which comprises contacting the surface to be treated with an aqueous acidic solution which consists essentially of an effective coating amount of hexavalent chromium ions, fluoride ions in an amount effective to attack the surface being treated, and 0.01 to 0.1 percent arsenic and maintaining the said aqueous acidic solution in contact with the surface to be treated until the desired protective coating is formed.

7. The method as claimed in claim 6 wherein the aqueous acidic solution also contains an aluminum fluoride complex ion.

8. A method for forming a protective coating on aluminum containing surfaces which comprises contacting the surface to be treated with an aqueous acidic solution which consists essentially of in percent w./v., 0.05 to 1 hexavalent chromium ion calculated as $CrO_3$, 0.1 to 2.7 fluoride ions, and 0.01 to 0.1 arsenic, and maintaining the said aqueous acidic solution in contact with the surface to be treated until the desired protective coating is formed.

9. The method as claimed in claim 8 wherein the aqueous acidic solution also contains, in percent w./v., 0.22 to 3.2 $Al(F)_x$ complex.

10. The method as claimed in claim 9 wherein the aqueous acidic solution contains, in percent w./v., 0.2 to 0.5 hexavalent chromium ions calculated as $CrO_3$, 0.16 to 1.6 fluoride ions, 0.03 to 0.1 arsenic and .22 to 1.9 $Al(F)_x$ complex.

11. A replenishing material for forming solutions for coating aluminum containing surfaces which consists essentially of, in parts by weight, 15 to 20 $CrO_3$; 7 to 12 HF; 1.4 to 7 $HNO_3$; 3 to 6.5 alkali metal arsenate; and 0.6 to 1.6 $Al(F)_x$ (average $AlF_3$).

12. The replenishing material as claimed in claim 11 wherein there is contained in parts by weight, 18 to 20 $CrO_3$; 10 to 12 HF; 5 to 7 $HNO_3$; 3 to 6 sodium arsenate; and 0.8 to 1.5 $Al(F)_x$.

13. The replenishing composition as claimed in claim 11 wherein there is contained in parts by weight, 15 to 17 $CrO_3$; 8 to 11 HF; 4.5 to 6.5 $HNO_3$; 3.5 to 6.5 sodium arsenate; and 1 to 1.6 $Al(F)_x$.

14. An aluminum surface having a coating thereon produced in according with the method as claimed in claim 6.

15. An aluminum surface having a coating thereon produced in accordance with the method of claim 10.

16. A make-up composition, suitable for forming solutions for coating aluminum containing surfaces which consists essentially of, in parts by weight:

| | |
|---|---|
| $CrO_3$ | 15–20 |
| HF | 4–7 |
| Arsenic activator composition | 1–5 |
| $Al(F)_x$ (average $AlF_3$) | 3–6 | wherein the activator composition is formed of a water soluble salt of arsenic acid.

References Cited
UNITED STATES PATENTS 2,471,909  5/1949  Spruance _____ 148—6.2
2,967,791  1/1961  Halversen _____ 148—6.27 X RALPH S. KENDALL, *Primary Examiner.*

UNITED STATES PATENT OFFICE
CERTIFICATE OF CORRECTION

Patent No. 3,385,738                                                  May 28, 1968

William S. Russell

It is certified that error appears in the above identified patent and that said Letters Patent are hereby corrected as shown below:

Column 1, line 72, "Moreover, These" should read -- Moreover these --. Column 2, line 1, "without the use" should read -- without use --; line 19, "which process capable" should read -- which process is capable --. Column 3, line 32, "fluoride ion" should read -- fluoride complex ion --; line 40, "refere" should read -- refer --. Column 4, line 1, "preliminary" should read -- preliminarily --; line 41, "efficiences" should read -- efficiencies --. Column 5, lines 2 and 7, "seconds'", each occurrence, should read -- seconds --. Column 7, line 28, "(NaHAsO$_4$.7H$_2$O)" should read -- (Na$_2$AsO$_4$.7H$_2$O) --; line 46, "NaHAsO$_4$.7H$_2$O" should read -- Na$_2$AsO$_4$.7H$_2$O --. Column 8, line 6, "principal" should read -- principle --.

Signed and sealed this 10th day of March 1970.

(SEAL)
Attest:

EDWARD M. FLETCHER, JR.                            WILLIAM E. SCHUYLER, JR.
Attesting Officer                                          Commissioner of Patents